June 26, 1956
T. F. BURKE, JR
2,752,584
SONIC SYSTEM
Filed Dec. 13, 1950
2 Sheets—Sheet 1
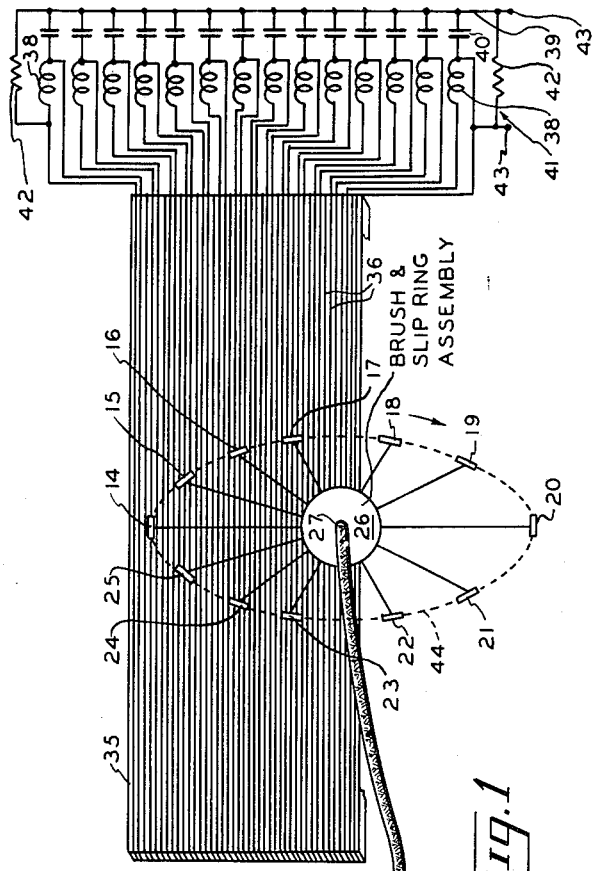
INVENTOR
THOMAS F. BURKE JR.
BY *Hyman Hurwitz*
ATTORNEY

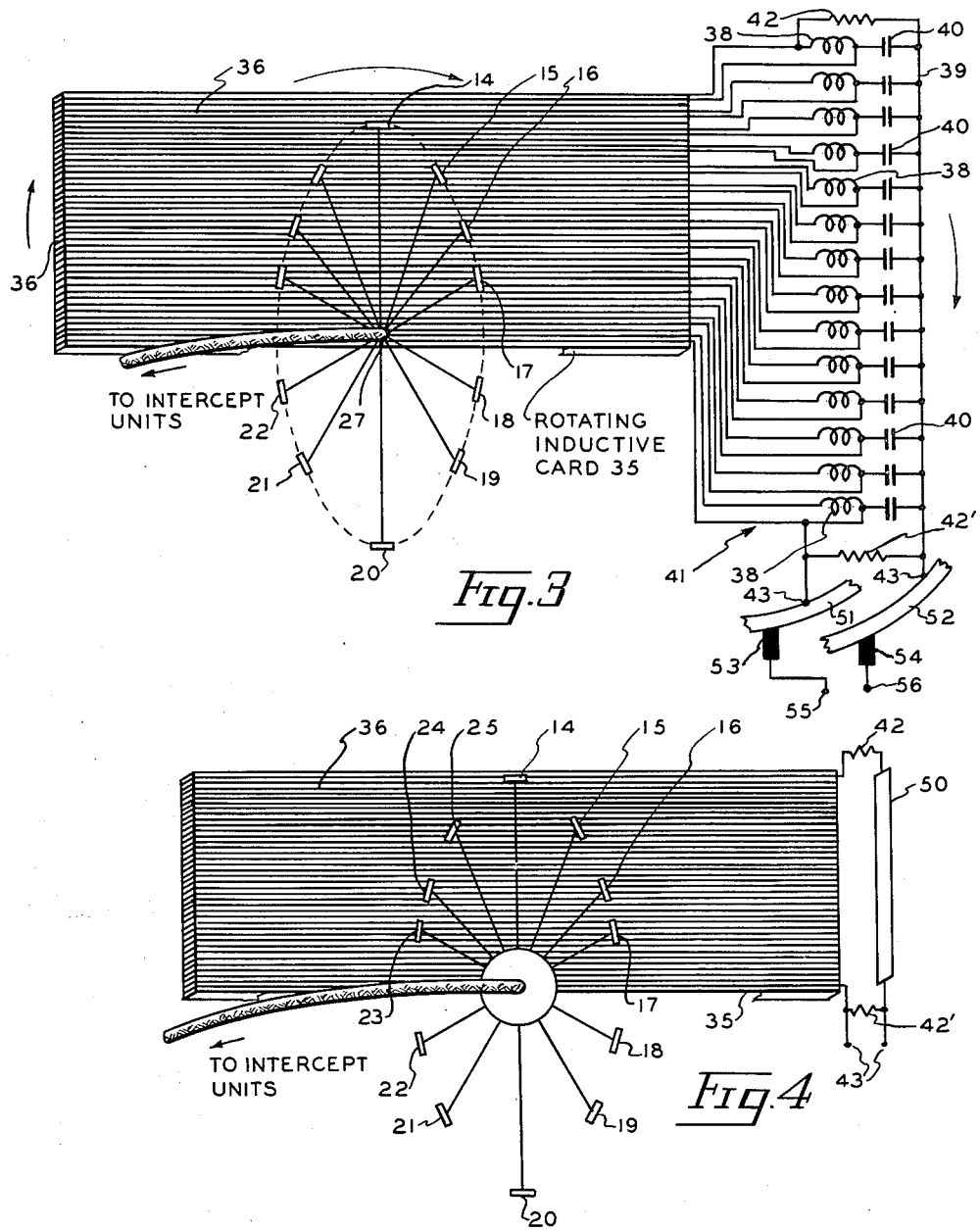

United States Patent Office 2,752,584
Patented June 26, 1956

2,752,584
SONIC SYSTEM

Thomas F. Burke, Jr., Falls Church, Va., assignor to Melpar, Incorporated, Alexandria, Va.

Application December 13, 1950, Serial No. 200,672

12 Claims. (Cl. 340—6)

The present invention relates generally to electrical compensators, to be utilized in systems for the directional reception of wave energy.

It is well known generally, in the art, that the direction from which wave energy arrives may be determined by means of a plurality of wave energy intercept devices, disposed in some predetermined pattern in space, without moving the intercept devices. To accomplish this end the wave energy received by each of the intercept devices may be delayed by a time interval such that all the wave energy is in phase at a single detecting device. The characters and magnitudes of the delays required is then a measure of the direction from which the wave energy was received. The device which introduces the delays is called a compensator.

In order to simplify compensators of the general character above briefly described, it is desirable that rotation of a single member only effect such coordinated delays of wave energies derived from a large number of wave energy intercept devices, that the position of the member corresponds to the direction of arrival of the wave energy.

Systems of this character are known and have heretofore been utilized primarily, though not exclusively, in apparatus for locating sounds in space, by means of a plurality of sound receivers or microphones distributed in a spatial pattern which may be determined by the configuration of a ship, for example. The present invention will be described as applied to a system of this character, without intending any limitation thereby as to possible applications of the invention to other types of wave energy or to other spatial patterns.

A common compensator employs a flat plate capable of rotation about a central axis perpendicular to the plate, the latter carrying on its face a plurality of adjacent parallel rectilinear conductive members, mutually insulated.

Each of the conductive members is connected to an element of a delay line, the elements being connected in series to form the delay line. The output of the delay line is connected to an indicator, which may be aural or visual, and which, in practice often comprises a cathode ray tube.

Wiper brushes are distributed on the surface of the plate, one for each wave energy intercept device, and the physical distribution of the wiper brushes is congruent to, but on a smaller scale than, the physical distribution of the intercept devices.

In a system of this character, and assuming a disposition of wiper brushes substantially congruent with a disposition of intercept devices, the directivity of the intercept devices is fully compensated when the angle of any axis of symmetry of the wiper brushes with respect to a direction at right angles with the rectilinear conductive members is equal to the angle between the direction of arrival of the wave energy and the same axis of symmetry of the intercept devices. The delay introduced by each delay line section is so arranged that under the conditions stated in this paragraph, signals applied to the delay line segments at times corresponding with arrival of wave energy at the respective intercept devices, arrive simultaneously at the output of the delay line.

In order to accomplish continuous scanning of direction, or continuous variation of directivity, of the system, with concomitant visual indications, the output of the delay line may be applied to effect radial deflection of a cathode ray beam, circular deflection of the beam being accomplished in synchronism with relative rotation of the wiper brushes and of the rectilinear conductive members. Alternatively, determinations of direction of arrival of wave energy may be made aurally, by relatively rotating the brushes and the strips until maximum sound is heard in phones, or the like, connected to the output of the delay line.

The defects which inhere in systems of the type above described are two. Firstly, to obtain accuracy of directional determination the conductive strips must be close together, and numerous, and hence narrow. It results that various of the brushes at times bridge two conductive strips, resulting in inaccuracy of direction measurement. Secondly, in continuously scanning systems wiping contact between the brushes and the strips involves mechanical problems, and problems of varying contact resistance, contact noise, and the like.

It is an object of the present invention to provide a compensator of the general type above described, but which requires no wiping contacts.

It is a further object of the invention to provide a wholly inductive compensator, which operates in a manner analogous to operation of a compensator utilizing conductive strips and contacting wipers or brushes, but which substitutes for the wipers or brushes inductive couplers, and for the elongated conductive strips, elongated inductive windings.

The above and still further features, advantages and objects of my invention will become apparent upon consideration of a specific embodiment of my invention, especially when taken in conjunction with the accompanying drawings, wherein:

Figure 1 is a plan view of a compensator arranged in accordance with the invention;

Figure 2 is a view in perspective showing the relation of an inductive pick-up head to inductive windings, in the system of Figure 1.

Figure 3 is a plan view of a compensator arranged in accordance with a modification of the invention;

Figure 4 illustrates in plan view a further modification of the invention; and,

Figure 5 represents an equivalent circuit diagram of a portion of the systems of Figures 1 and 3.

Referring now more particularly to Figure 1 of the drawings, the reference numerals 1, 2, 3, . . . 12, identify twelve wave energy intercept units, which may be, for example only, microphones or crystals, responsive to sonic or supersonic wave energy, and disposed about the hull of a vessel, conventionally illustrated at 13. It will be realized that any specific number of intercept devices may be employed, as desired, and that these may occupy any desired configuration, regular or irregular, and be spaced in any convenient spacing, regular or irregular. Further, the intercept devices, per se, may be directional or substantially non-directional, without departing materially from the true spirit of the present invention.

The individual intercept devices are connected, either directly or via an appropriate amplifier, each to a separate inductive coupler, the latter being identified by the reference numerals 14, 15 . . . 25, respectively. The connection between any specific intercept unit, as 1, and the corresponding inductive coupler, as 14, is made via a brush and slip-ring, to enable rotation of the coupler about an axis without corresponding motion of the intercept unit 1, and without breaking the circuit therebetween.

Since there are in all, in my example, twelve intercept units 1 to 12, inclusive, and twelve corresponding inductive couplers, 14 to 25, inclusive, twelve brushes and slip-rings are required. The brushes and slip-rings are illustrated, to simplify the drawings, as included in a brush and slip-ring assembly 26, having an axis 27, with respect to which the slip-rings rotate, and with respect to which the inductive heads 14–25, inclusive, also rotate.

The inductive couplers 14–25, inclusive, are rotatable as a unit about the axis 27, without changing their relative positions, and the physical arrangement of the couplers 14–25, inclusive, is congruent to that of the intercept devices 1–12, inclusive, but may be on a very much smaller scale.

Each of the inductive couplers as 14, taken for example, comprises a U-shaped magnetic member 25, having a winding 29 linked therewith, and having legs 30, 31, the ends 32, 33 of which are toed in, and separated by a narrow elongated air gap, as at 34. Any variation of current in winding 29 results in a corresponding variation of magnetic flux in and near air gap 34.

The inductive couplers 14–25, inclusive, occupy a common plane, which is slightly separated from a plate 35, parallel to that plane. Wound on the plate 35 is a large number of turns of wire 36, mutually insulated, the turns being broken, at frequent intervals to enable the insertion of an external coil, as 38, in series.

Between an end of each external coil, as 38, and a common line, as 39, is connected a separate condenser, as 40.

The windings 36, the coils 38, and the condensers 40, are inter-connected, thus, and the electrical constants thereof are so chosen, as to provide a common type of delay line, 41. The inductive couplers 14–25, inclusive, are inductively coupled to this delay line, through the windings 36, and hence at separations along the delay line corresponding with that distance perpendicular to the turns, which separates the couplers. By properly designing the system the delays along the delay line 41 are so proportioned that the time consumed by a signal in passing from one point to another along the plate 36, in a given direction, corresponds with the time required for wave energy to travel between congruent points in the medium in which are immersed the intercept units 1–12, inclusive.

The delay line 41 may be terminated at both ends by resistances 42 and 42' equal to the characteristic impedance of the line, to avoid reflections, and its output may be taken across the resistance 42', at terminals 43.

It has been determined experimentally that the amount of insertion loss introduced by reason of the spacing between the windings 36 and any inductive coupler, as 14, is non-critical, and varies but slightly with considerable variation of spacing. It follows that the mechanical structure of the present system is considerably simplified, in comparison with systems of the prior art requiring brush contacts, and that its fabrication is far more economical. Further, noises due to wiping contacts are eliminated, as well as friction and wear, at all speeds of rotation, thereby attaining the desired objects and advantages of my invention.

As the inductive couplers 14–25 are rotated as a unit about the axis 27, the direction from which wave energy signals must be received by the intercept units 1–12, inclusive, in order that all signals applied to the delay line 41 may arrive at its termination simultaneously, or in phase, varies correspondingly. The orientation of the inductive couplers 14–25, inclusive, when the outputs of the delay lines are in phase, is therefore, a measure of the direction from wave energy is being received by the intercept devices 1–12, inclusive.

The total physical extent of the plate 35 and the windings 36 may be such, if desired, that a considerable number of the inductive couplers, as 18–22, inclusive, for example, in the illustrated orientation of inductive couplers 14–25, and specifically those corresponding with directions from which no wave energy is arriving, may be decoupled from the windings 36.

As illustrated, if wave energy is arriving from a true northerly direction, when that wave energy impinges on wave intercept unit 1, a signal is induced in inductive coupler 14. When the wave front arrives at intercept units 2 and 12, signals are induced by the units in inductive couplers 15 and 25, respectively.

The signal from inductive coupler 14 has traversed part of the delay line in the interval while wave energy is traveling from intercept unit 1 to intercept units 2 and 12, and the delay line is so designed that the signal from inductive coupler 14 and from inductive couplers 15 and 25 are superimposed in phase at the termination of the delay line. Operation is analogous for intercept units 3, 11 and 4, 10, with respect to inductive couplers 16, 24 and 17, 23, respectively. It follows that all intercepted wave energy which effects coupling of signals into windings 36, and hence into delay line 41, causes in-phase energy at the output terminals 43, of the delay line 41.

Intercept units 9, 5, 8, 6, 7, are not coupled to the delay line 41, in this operation, because the inductive couplers 18, 22, 19, 21, 20, do not overlie, and are not coupled with, the windings 36, for the stated orientation of the inductive couplers, 14–25, inclusive.

Should wave energy arrive at intercept units 1–12, inclusive, traveling in a northerly direction, i. e., from the south, this fact would be indicated when the orientation of the inductive couplers 14–25, inclusive, is such that unit 20 points due north, i. e., upon 180°, shift in direction of the inductive units 14–25, inclusive, from that illustrated. For this condition inductive couplers 14, 15, 16, 17, 23, 24, 25 become inoperative, or decoupled, and signals intercepted by intercept units 7, 6, 8, 5, 9, alone transfer signals to the delay line 41.

It will be realized that the present system is operative whether or not all the inductive couplers 14–25, inclusive, are at all times coupled with windings 36. The specific embodiment disclosed and illustrated, in which certain couplers are always decoupled, is, however, found to be practically preferable for many purposes.

It will be noted that the inductive couplers, as 14, of the invention have each an elongated air gap, as 34, which has a specific orientation. The voltage induced by an inductive coupler in the windings 36 is therefore a cosine function of the orientation of the system of inductive couplers, 14–25, inclusive.

Each gap is initially parallel to the tangent of the curve 44 outlining the inductive couplers 14–25, inclusive. It follows that the intensity of the signal induced by any one of inductive couplers 14–25 in windings 36, is a maximum for that coupler which receives signal first, and decreases as a cosine function of delay in couplers receiving signals subsequently. So, when receiving signals from due north, in Figure 1, coupler 14 induces maximum signal in windings 36 and couplers 17 and 23 induce minimum signal. It has been found that the cosine response obtainable with the described inductive coupler structure is of value in obtaining suppression of secondary lobes of radiation pattern, for the configuration of intercept units disclosed. It is true, however, that for different configurations some other law of response of the inductive couplers may be of value, or inductive heads having equal response for all orientations may prove preferable. The use of orientable inductive couplers having a response varying with orientation provides, nevertheless, a valuable feature insofar as concerns design of the response pattern of the system.

Reference is now made particularly to Figure 5 of the accompanying drawings, wherein is shown an equivalent circuit diagram of the delay line and the windings 36. It will be noted that each section of winding 36 is in series with an inductance 38 comprised in delay line 41, so that the inductance of the windings 36 is included as part of the inductance of the delay line, or otherwise stated so that the windings 36 comprise, electrically, part of the delay line and contribute to the electrical constants thereof.

In the limit then, the system of Figure 1 may, especially if the frequencies employed become sufficiently high, become a system in which the inherent inductance and capacity of the windings 36 of the delay line are sufficiently great to provide the desired delays. If the inductance of the windings 36 becomes sufficiently great, but the distributed capacity does not, then the delay line 41 may degenerate into a delay line employing no external inductances 38, but only capacities 40. If, on the other hand, the distributed capacity becomes also sufficiently great, a system of the type illustrated in Figure 4 evolves, comprising a plate 35 on which is wound windings 36, and in which a strip of metal as 50 is placed adjacent an edge of the plate 35, in insulated relation to the windings 36, to provide capacity with respect to the windings 36. Clearly the plate 35 itself may be used for this purpose, if of metal. The terminating impedance 42 and 42' may then be connected between the outermost terminals of the windings 35 and the metal strip 50, and the output signals may be derived across terminals 43 as in the case of the system of Figure 1. The system of Figure 4 may then be the full equivalent of the system of Figure 1, except for the tremendous simplification of the delay line structure which has resulted by utilizing the inherent inductance of the windings 36 and the inherent capacities existing between the turns of the windings.

In systems of the type forming the subject matter of this application, it is not uncommon to utilize an extremely large number of intercept units as 1, 2, 3, and this number, in many cases, approaches or exceeds 100. This leads to an extremely complex brush and slip-ring assembly 26, since the brush and slip-ring assembly requires as many brushes and slip-rings as there are intercept heads. It follows that a very considerable simplification of the present system would be possible, if the brush and slip-ring assembly 26 could be eliminated.

Such a simplification is made possible in the system illustrated in Figure 3 of the accompanying drawings, wherein the inductive couplers 14, 15, 16 . . . 25 remain fixed in position, and wherein the plate 35 rotates, about axis 27. In such case, each intercept unit may be directly connected through a multiwire cable with a corresponding inductive coupler, the intercept unit 1 with the inductive coupler 14, intercept unit 2 with the inductive coupler 15, etc. Since the plate 35 now rotates, the delay line 41 must rotate therewith, and accordingly the terminals 43 no longer remain stationary. To derive signal from the terminals 43, there are provided two slip-rings 51 and 52, in permanent contact, respectively, with separate ones of the terminals 43, and signals are derived from the slip-rings 51 and 52 via brushes 53 and 54, respectively, which supply terminals 55 and 56, respectively. Accordingly, in the system of Figure 3, the results attainable by means of the system of Figure 1, become possible with a radical simplification, i. e., the substitution of two slip-rings, for a very large number of slip-rings.

It will be clear that the system of Figure 4 may be of the type in which the plate 35 rotates, i. e., of the type illustrated in Figure 3 of the accompanying drawings, or that in the alternative the system of Figure 4 may be of the type illustrated in Figure 1 of the accompanying drawings, since, in either case, the delay line structure itself may be simplified, and in the limit, eliminated as a separate structure, as it becomes possible to employ the inductance and the inter-winding capacity of the windings 36 to introduce the required delays.

While I have described and illustrated specific forms of the invention it will be clear that variations thereof may be resorted to without departing from the true scope of the invention as defined in the appended claims.

What I claim and desire to secure by Letters Patent of the United States is:

1. In a directional system for receiving wave energy, the combination of a plurality of wave energy intercept devices arranged in a first predetermined pattern in space, an indicator, phase adjusting means interposed between each of said wave energy intercept devices and said indicator, said phase adjusting means comprising a plurality of electromagnetic coupling devices arranged in a further predetermined pattern in space, said first and further predetermined patterns congruent one to another and of different dimensions, a further magnetic coupling device having a large number of laterally extending parallel current conducting members connected in a series circuit, said first mentioned electromagnetic coupling devices each comprising a magnetic pickup head including a magnetic loop having an open slot adjacent said further magnetic coupling device, said open slot having a fixed orientation in space with respect to the orientation of said current conducting members, said orientation adapted to suppress secondary lobes of radiation pattern of received wave energy and a delay line having delay segments each connected in series with a different plurality of said current conducting members in said series circuit, means connecting said indicator to said delay line and means for providing mutual rotation of all said electromagnetic devices and of said current conducting members.

2. In a directional system for receiving wave energy, the combination of, a plurality of wave energy intercept devices arranged in a first predetermined pattern in space, an indicator, phase adjusting means interposed between each of said wave energy intercept devices and said indicator, said phase adjusting means comprising a plurality of electromagnetic coupling devices arranged in a further predetermined pattern in space, said first and further predetermined patterns congruent one to another, and of different dimensions, a further electromagnetic coupling device having a large number of laterally extending parallel current conducting members connected in a series circuit, and a delay line having delay segments each connected in series with a different plurality of said current conducting members in said series circuit, means connecting said indicator to said delay line, and means for maintaining said electromagnetic coupling devices stationary and for rotating said current conducting members with respect thereto.

3. In a directional wave energy system, the directivity of which may be altered at will, the combination with a plurality of wave energy intercept devices arranged in a mutually fixed spatial pattern, of means effectively coupled to all said wave energy intercept devices to combine the wave energies intercepted by said wave energy intercept devices, a wave energy delay device having a plurality of series connected segments, and an inductive device for coupling said wave energy intercept devices selectively to said segments of said wave energy delay device, said inductive device including a magnetic loop having an axis of symmetry and an open slot, in a plane perpendicular to said axis, of fixed rotative orientation relative to said axis, said orientation selected to minimize secondary lobes of radiation pattern of directivity of said system.

4. In a directional wave energy system, the directivity of which may be altered at will, the combination with a plurality of wave energy intercept devices arranged in a mutually fixed spatial pattern, of a separate inductive unit connected with each of said intercept devices to translate into magnetic field variations the wave energy received by said each of said intercept devices, and means for combining said magnetic field variations, comprising a wave energy delay device having a plurality of series connected segments, and means for solely inductively coupling said separate inductive units selectively to said segments of said wave energy delay line, said means for solely inductively coupling comprising a plurality of magnetic pick-up heads, each of which includes a magnetic energy input slot, in a magnetic loop, said slots arranged to have predetermined fixed angles relative to a pattern in space, said angles selected to minimize secondary lobes of radiation pattern of directivity of said system.

5. In a directional system for wave energy, a plurality of wave energy interceptor devices arranged in a predetermined patern in space, a plurality of inductive coupling devices arranged in a pattern in space substantially congruent with said predetermined pattern, said inductive coupling devices including a structure of magnetic material having a pair of separated pole pieces, said pole pieces constituting a magnetic flux intercept gap, the separation between said poles being relatively small and the poles being relatively elongated along the gap, means intercoupling corresponding ones of said intercept devices and coupling devices, in one for one relation, a single delay device comprising a plurality of parallel conductors connected in series, said conductors subsisting in a first plane, means supporting said plurality of inductive coupling devices in a second plane parallel with said first plane and displaced therefrom by a distance establishing substantial inductive coupling only between certain of said parallel conductors and certain of said inductive coupling devices, and means for relatively rotatively actuating said parallel conductors and said inductive coupling devices in the planes thereof only.

6. In a system for determining the direction of arrival of wave energy at a geographic location, and wherein is provided a plurality of wave energy intercept devices arranged in a predetermined spatial pattern for receiving said wave energy with different delay times, the combination of a single delay device arranged to compensate for said delay times, said single delay device comprising a plurality of parallel conductors connected in series and subsisting in a first plane, said parallel conductors including substantial distributed inductance and capacity, a plurality of inductive coupling devices arranged in a second plane parallel with and displaced from said first plane by a distance establishing substantial inductive coupling between said inductive coupling devices and immediately adjacent parallel conductors, and in a spatial pattern congruent with said predetermined spatial pattern, means for intercoupling intercept devices and inductive coupling devices which correspond within said patterns, respectively, means for deriving output signals from said parallel conductors connected in series, and means for varying the relative positions of said inductive coupling devices and said delay device so as to vary the relative delays introduced between each of said inductive coupling devices and said means for deriving output signals.

7. In a system for determining the direction of arrival of wave energy at a geographic location, and wherein is provided a plurality of wave energy intercept devices arranged in a predetermined spatial pattern for receiving said wave energy with different delay times, the combination of a single delay device arranged to compensate for said delay times and comprising a plurality of parallel conductors connected in series and subsisting in a first plane, a plurality of inductive coupling devices arranged in a second plane parallel with and displaced from said first plane by a distance establishing substantial inductive coupling between said inductive coupling devices and immediately adjacent parallel conductors, and in a spatial pattern congruent with said predetermined spatial pattern, each of said inductive coupling devices including a magnetic structure having a pair of separated poles, said poles defining a magnetic flux intercept gap, the separation between said poles being relatively small and the poles being relatively elongated along the gap, means for intercoupling intercept devices and inductive coupling devices which correspond within said patterns, respectively, means for deriving output signals from said parallel conductors connected in series, and means for varying the relative positions of said inductive coupling devices and said delay device so as to vary the relative delays introduced between each of said inductive coupling devices and said means for deriving output signals.

8. In a directional system for wave energy, a plurality of wave energy intercept devices arranged in a predetermined pattern in space, a plurality of stationary inductive coupling devices arranged in a pattern in space substantially congruent with said predetermined pattern, means intercoupling corresponding ones of said intercept devices and coupling devices, in one for one relation, a single delay device comprising a plurality of parallel conductors connected in series, said conductors subsisting in a first plane, means supporting said plurality of inductive coupling devices in a second plane parallel with said first plane and displaced therefrom by a distance establishing substantial inductive coupling only between certain of said parallel conductors and certain of said inductive coupling devices, and means for relatively rotatively actuating said parallel conductors and said inductive coupling devices in the planes thereof only.

9. In a directional system for wave energy, a plurality of wave energy intercept devices arranged in a predetermined pattern in space, a plurality of electromagnetic coupling devices arranged in a pattern in space substantially congruent with said predetermined pattern, means intercoupling corresponding ones of said intercept devices and coupling devices, a single delay device consisting of a plurality of parallel conductors connected in series, said conductors subsisting in a first plane, means supporting said plurality of inductive coupling devices in a second plane parallel with said first plane and displaced therefrom by a distance establishing substantial inductive coupling between certain of said parallel conductors and certain of said inductive coupling devices, and means for relatively rotatively actuating said parallel conductors and said inductive coupling devices in the planes thereof only.

10. In a directional system for receiving wave energy, the combination of, a plurality of at least six sonic wave energy intercept devices arranged in a first predetermined pattern in space, an indicator, phase adjusting means interposed between each of said wave energy intercept devices and said indicator, said phase adjusting means comprising a plurality of electromagnetic coupling devices having coupling air gaps in a ferromagnetic circuit, and arranged in a further predetermined pattern in space, said first and further predetermined patterns congruent one to another, and of different dimensions, said phase adjusting means further comprising a large number of laterally extending parallel current conducting members connected in a series circuit, said last mentioned phase adjusting means having distributed inductance and capacity constituting some a delay line, and means for providing mutual rotation of all said electromagnetic coupling devices and of said current conducting members.

11. The combination in accordance with claim 10 wherein said air gaps are so oriented in space as to minimize secondary lobes of radiation pattern of directivity of said system.

12. The combination in accordance with claim 10 wherein said air gaps are arranged to provide a cosine law of response during said mutual rotation.

References Cited in the file of this patent

UNITED STATES PATENTS

| 1,628,992 | Mills | May 17, 1927 |
| 1,682,712 | Pierce | Aug. 28, 1928 |
| 1,995,708 | Fischer | Mar. 26, 1935 |
| 2,344,431 | Villem | Mar. 14, 1944 |
| 2,378,555 | Jasse | June 19, 1945 |